Figure 1:
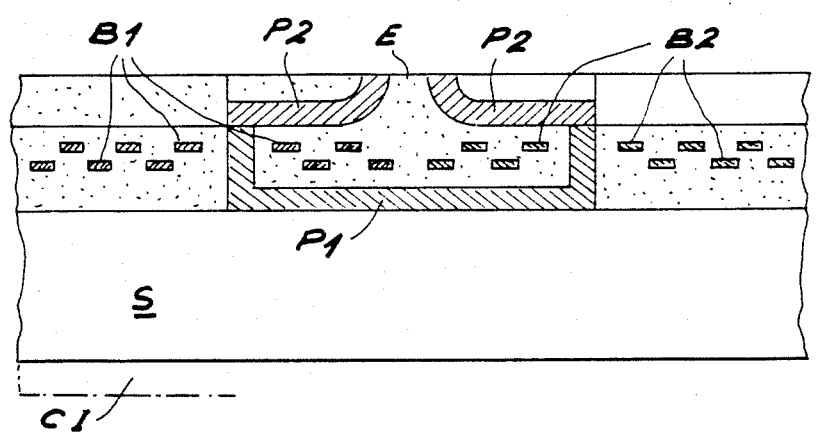

United States Patent [19]

Deroux-Dauphin

[11] Patent Number: 4,829,659
[45] Date of Patent: May 16, 1989

[54] PROCESS FOR THE PRODUCTION OF A MAGNETIC HEAD MAKING IT POSSIBLE TO SIMPLIFY THE PRODUCTION OF ELECTRICAL CONNECTIONS

[75] Inventor: Patrice Deroux-Dauphin, Grenoble, France

[73] Assignee: Commissariat A L'Energie Atomique, Paris, France

[21] Appl. No.: 246,003

[22] Filed: Sep. 15, 1988

Related U.S. Application Data

[63] Continuation of Ser. No. 113,250, Oct. 26, 1987, abandoned.

[30] Foreign Application Priority Data

Oct. 31, 1986 [FR] France ............................... 86 15224

[51] Int. Cl.⁴ ............................................. G11B 5/127
[52] U.S. Cl. ........................................ 29/603; 29/829; 29/853; 156/652; 156/655; 156/656; 156/659.1; 156/902; 204/15; 204/18.1; 204/44.5
[58] Field of Search ................ 29/603, 829, 852, 853; 204/15, 18.1, 44.5; 156/652, 655, 656, 659.1, 902; 360/125, 126

[56] References Cited

U.S. PATENT DOCUMENTS

| | | | |
|---|---|---|---|
| 4,211,603 | 7/1980 | Reed | 156/659.1 |
| 4,285,780 | 8/1981 | Schachter | 156/659.1 |
| 4,402,801 | 9/1983 | Omata et al. | 204/15 |
| 4,625,250 | 11/1986 | Shibata | 360/125 |
| 4,639,289 | 1/1987 | Lazzari | 360/125 |

FOREIGN PATENT DOCUMENTS

0152327  8/1985  European Pat. Off. .

OTHER PUBLICATIONS

Japanese Patent Abstracts, vol. 7, No. 150, (P-207) (1295), Jun. 30, 1983 & JP-A-58 60 420, (DDenshi Keisanki Kihon Gijutsu Kenkiyuu Kumiai) 09.04.83.
Japanese Patent Abstracts, vol. 10, No. 22, (P-424) (2079), 28.01.86 JP-A-60 175 207.
Japanese Patent Abstracts, vol. 9, No. 156 (P-368) (1879), 29.06.85 JP-A-60 29 914, (Nippon Denshin Denwa Kosha), 15.02.85.
Japanese Patent Abstracts, vol. 9, No. 304 (P-4090) (2027), 30.11.85; JP-A-60 136 906, (Hitachi Seisakusho K.K.) 20.07.85.

Primary Examiner—P. W. Echols
Attorney, Agent, or Firm—Pearne, Gordon, McCoy & Granger

[57] ABSTRACT

Process for producing a magnetic head with a horizontal structure. A planar subassembly is formed having a first pole piece (38), interconnection tracks (40, 42) and intraconnection tracks (32, 34) through the substrate. The connections are surrounded by a guard ring (54, 56, 58). It is then necessary to form a winding, which is connected to tracks (40, 42) and a second pole piece.

6 Claims, 4 Drawing Sheets

PROCESS FOR THE PRODUCTION OF A MAGNETIC HEAD MAKING IT POSSIBLE TO SIMPLIFY THE PRODUCTION OF ELECTRICAL CONNECTIONS

This is a continuation of application Ser. No. 113,250, filed on Oct. 26, 1987 abandoned.

DESCRIPTION

The present invention relates to a process for producing a magnetic head. The present magnetic head is of the thin film type and has a horizontal structure. Such a head is diagrammatically shown in section in FIG. 1. On a substrate S is located a first pole piece P1, a winding formed from two parts B1, B2, e.g. each constituted by two complementary spirals located in different planes and a second pole piece P2, which is in two parts separated by an amagnetic air gap E.

The magnetic track to be recorded or read passes in front of the air gap E. To the rear of the head, there can be an integrated circuit CI, which is used for processing signals supplied by the windings or transmitted thereto.

Figure 2:
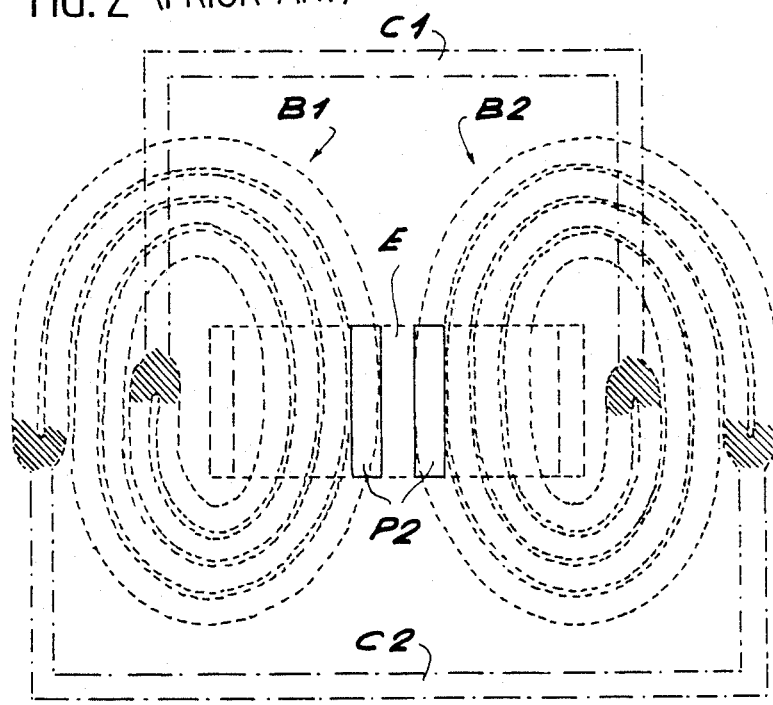

FIG. 2, which is a simplified plan view, shows the two windings B1, B2, in the form of a double spiral and extending on either side of the air gap. Such a head with a horizontal structure is e.g. described in European patent application No. EP-A-0 152 326.

The present invention relates to a process for producing various electrical connections found on such a head, namely connections between the various windings (hereinafter called "interconnections") and connections between the plane where these windings are located and the rear face of the substrate where the integrated circuit is located (and which will hereinafter be called "intraconnections"). The interconnections comprise a means making it possible to connect the contact pieces within the spirals and the contact pieces outside the spirals. These interconnections are represented by tracks C1 and C2 in FIG. 2.

The invention proposes a simple process consisting of preparing a substrate with an etched insulant and filled by a single material, said material being both magnetic for forming the first pole piece and electrically conductive for constituting two interconnection tracks and conductive passages traversing the substrate. The subsequent operations of forming the coil and producing the second pole piece are of a conventional nature and take place after obtaining said subassembly provided with interconnections and intraconnections.

The features of the invention can be better gathered from the following description of an exemplified, non-limitative embodiment with reference to the attached drawings, wherein show:

FIG. 1 Already described, a diagrammatic section of a magnetic head with a horizontal structure.

FIG. 2 The same head in plan view.

Figure 3:
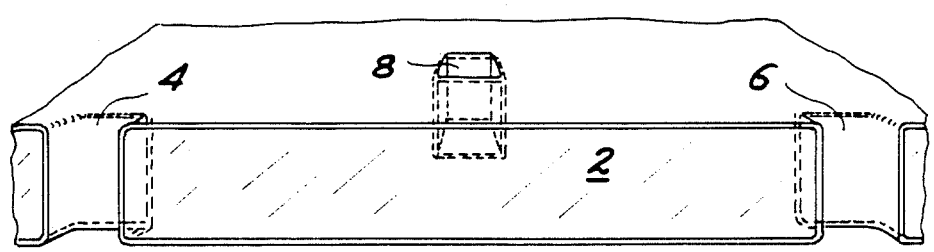

FIG. 3 A first stage of the process according to the invention.

Figure 4:
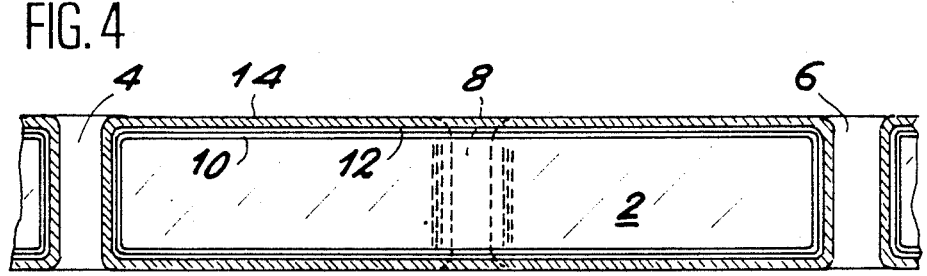

FIG. 4 A second stage of this process.

Figure 5:
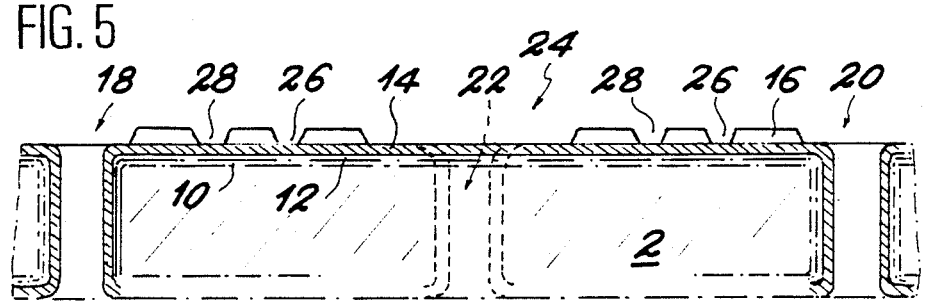

FIG. 5 A third stage of this process.

Figure 6:
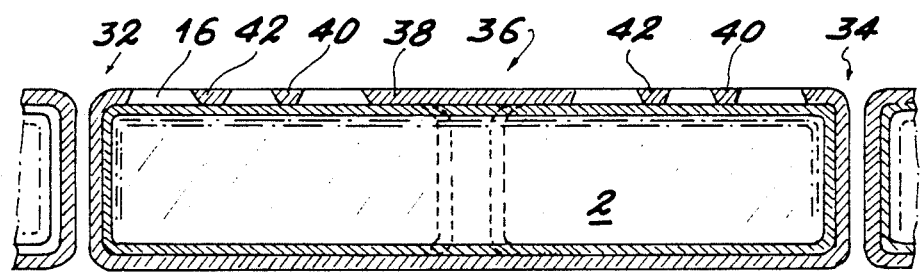

FIG. 6 A fourth stage of this process.

Figure 7:
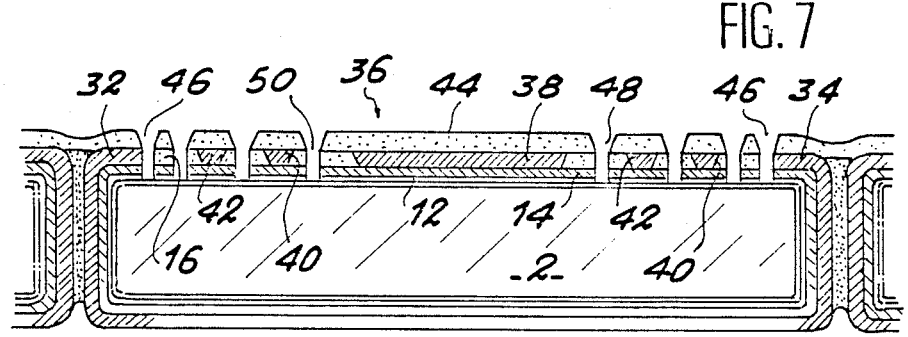

FIG. 7 A fifth stage of this process.

Figure 8:
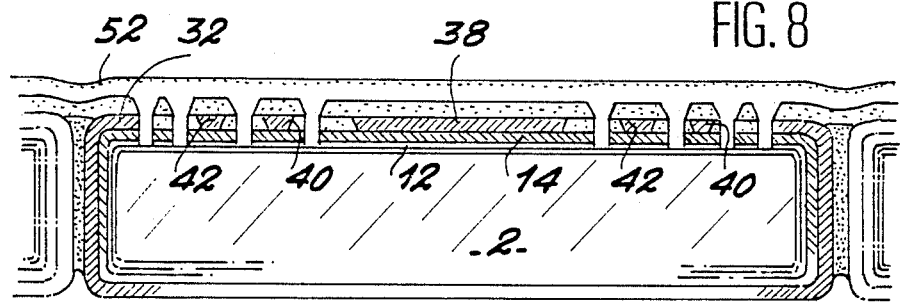

FIG. 8 A sixth stage of this process.

Figure 9:
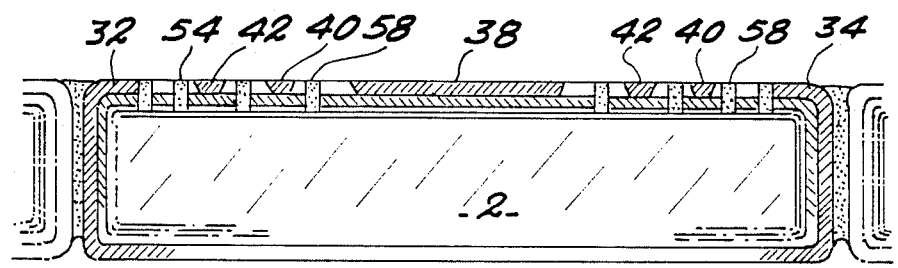

FIG. 9 A seventh stage of this process.

Figure 10:
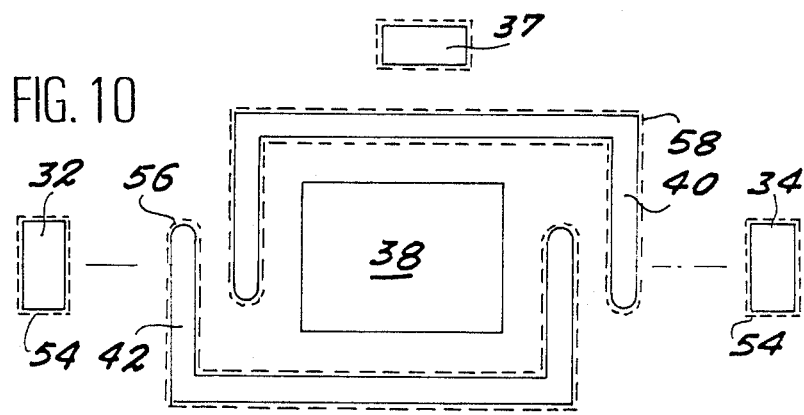

FIG. 10 In plan view, the subassembly obtained after the seventh stage.

Figure 11:
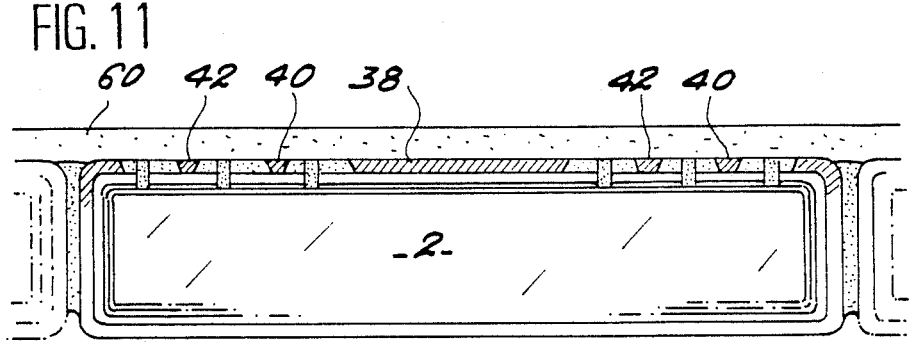

FIG. 11 An eighth stage.

Figure 12:
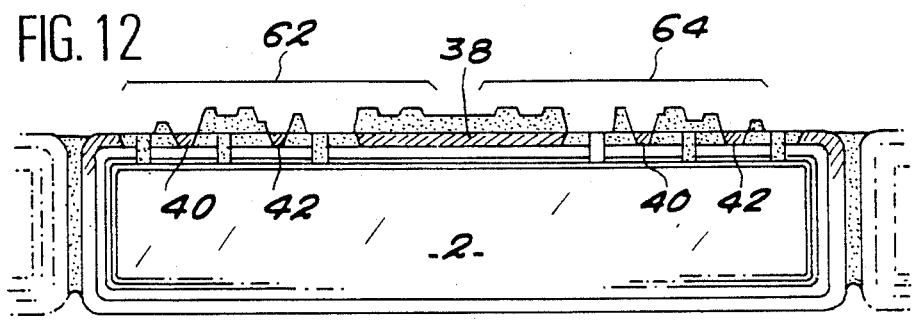

FIG. 12 A ninth stage.

Figure 13:
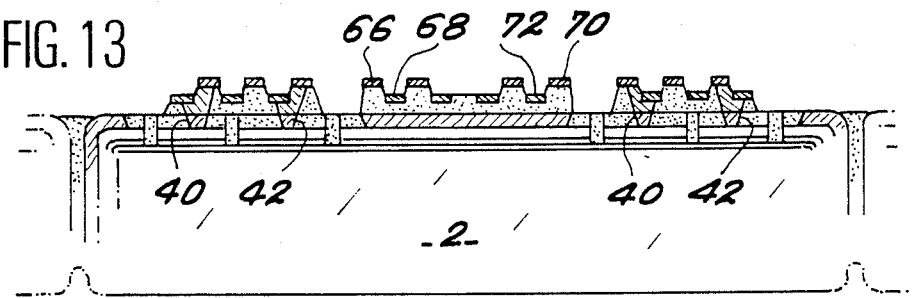

FIG. 13 A tenth stage.

Figure 14:
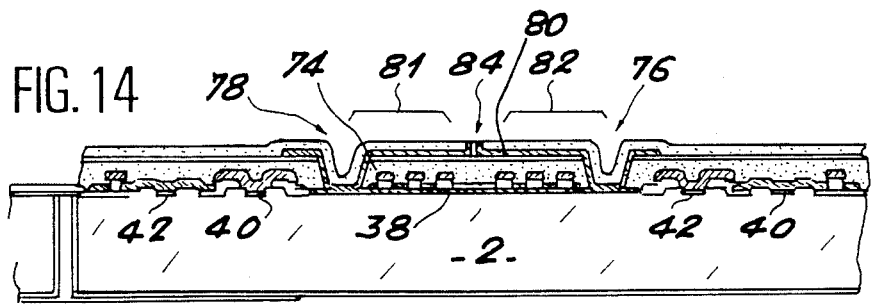

FIG. 14 In section, the ultimately obtained head.

FIG. 3 shows a substrate which can be of an insulting or semiconductive nature 2, e.g. made from silicon and in which is made holes 4, 6, 8 at locations where the future intraconnections will be located between the two substrate faces. Hole 8 is located to the rear and the section is assumed to pass through the axis of holes 4 and 6. This is followed by an oxidation of substrate 2 in order to produce an insulating layer 10 on the complete substrate and in holes 4, 6 and 8.

FIG. 4 shows the assembly obtained after depositing a conductive layer, e.g. by the deposition of polycrystalline silicon 12 followed by a tungsten deposit 14. It is also possible to use any other metal which is deposited in the vapour phase or in any other way, such as electrolytic plating.

On one of the faces of the substrate is then deposited an insulating layer 16, which is e.g. obtained by chemical vapour deposition (CVD) assisted by plasma. This insulating layer 16 is etched to obtain on the one hand, above holes 4, 6 and 8, zones 18, 20 and 22 at the location of the future contact pieces for intraconnections from one face to the other of the substrate and on the other hand a rectangular recess 24 at the location of a future first pole piece and finally two U-shaped slots 26, 28, one passing round the recess by one of its sides and the other passing round the recess by its other side. Etching is continued until the conductive layer 12, 14 is exposed (FIG. 5).

Using the double conductive layer 12, 14 as the electrode, a conductive magnetic metal, e.g. a Fe—Ni alloy is electrolytically deposited. Thus, in zones 18, 20 and 22 are formed hollow conductive pieces 32, 34 and 36, a first magnetic piece 38 and two interconnection tracks 40, 42. These conductive elements are visible in FIG. 6, the thickness thereof being between 1 and several microns.

FIG. 7 shows a supplementary stage following the deposition of an insulating layer 44 on the first face and in the conductive pieces and etching the assembly formed by said final insulating layer 44, insulating layer 16 and metal layer 12, 14. This leads to groove 46 surrounding the intraconnection pieces 32, 34, 36, a groove 48 surrounding the interconnection track 42 and a groove 50 surrounding the other interconnection track 40.

This is followed by the deposition of an insulant 52 (e.g. a polymer) on the first face, including in grooves 46, 48, 50 (FIG. 7). This insulant 52 is then etched until the appearance of the first pole piece 38, the interconnection tracks 40, 42 and the intraconnection pieces 32, 34. An insulating guard ring 54 is left around the intraconnection pieces 32,34 and around two interconnection tracks 40, 42. This gives a subassembly shown in section in FIG. 9 and in plan view in FIG. 10, said subassembly being planar.

It is then a question of completing the head by the formation of a coil and producing the second pole piece. Any known process can be used for this purpose. FIGS. 11 to 13 show a few possible operations, but others can be imagined, knowing that the pole piece 38 is not insulated with respect to the remainder of the substrate and can therefore continue to serve as an electrode for the remainder of the technological process.

FIG. 11 shows the subassembly obtained as a result of the previously described operations following the depositions of an insulating layer 60. In said insulant are etched two spiral, symmetrical slots 62, 64, on either side of the first pole piece (FIG. 12). A metal is deposited on the thus etched insulant, which gives rise to two complementary conductive spirals 66, 68, 70, 72 on either side of the magnetic piece 38, as can be seen in FIG. 13. These spirals are located on two different planes 66, 70 and 68, 72. These spirals respectively come into contact with the tracks 40, 42 ensuring their interconnection.

FIG. 14 shows the complete head obtained after an insulating layer 74 has been deposited, after two wells 76, 78 have been etched in order to free one of the edges of the first magnetic piece 38 and after the deposition of a magnetic layer 80, which comes into contact with the first layer 38. This layer comprises two parts 81, 82 separated by an amagnetic air gap 84.

Such operations are described in the aforementioned European patent.

A variant of this process comprises, initially, on the basis of conductive layer 12, 14, solely filling holes 18, 20 and 22, their location being defined by a mask, like that described hereinbefore. Chemical etching makes it possible to planarize the surface. Subsequently, it is e.g. possible to reinforce the conductive layer by another metal layer deposited by cathodic sputtering and to continue with the remainder of the process described hereinbefore. The total filling of the holes with a magnetic, conductive material can serve two purposes, the first being to have a homogeneous current intake over the entire plate and the second is to optionally use said interconnection as a magnetic channel.

I claim:

1. Process for producing a magnetic reading and writing head in thin film form and with a horizontal structure, comprising the steps of:
   forming on a front face of a substrate a recess having the shape of a future pole piece and two slots surrounding said recess,
   filling said recess and slots with a conductive magnetic material to form a first pole piece in said recess and two interconnection tracks in said slots,
   forming a conductive winding in two parts surrounding part of said first pole piece, said two parts having terminals in contact with said interconnection tracks,
   forming a second pole piece in contact with said first pole piece and having two parts separated by an amagnetic gap.

2. Process according to claim 1, comprising further the step of forming intraconnections between said front face of said substrate and a rear face of said substrate by forming holes through the substrate and by at least partly filling said holds with said conductive magnetic material.

3. Process according to claim 2, wherein the conductive magnetic material used for forming said interconnections and said intraconnections and the first pole piece is electrolytically deposited by a prior deposition of a conductive layer on the front face of said substrate and in said holes, said layer serving as an electrode.

4. Process according to claim 3, comprising further the steps of:
   making holes in said substrate at locations at which will be located the future said intraconnections between the two faces of the substrate,
   carrying out an oxidation of said substrate in order to produce a first insulating layer on the entire substrate and in the holes,
   depositing a conductive layer on the complete substrate, including the holes,
   depositing on said front face of said substrate a second insulating layer,
   etching said second insulating layer to define, above said holes, zones at locations of the future contact pieces for the intraconnections between front and rear faces of the substrate, a rectangular recess at the location of a future first pole piece and two U-shaped slots, one passing round the recess by one of its sides and the other passing round the recess by the other side, said etching exposing the conductive layer,
   using the conductive layer as the electrode for depositing electrolytically a conductive magnetic material, to thus form in zones of hollow contact pieces above and in the holes, a first magnetic pole piece and two interconnection tracks,
   depositing a third insulating layer on the face with the first pole piece and in the conductive pieces,
   etching the assembly formed by said third insulating layer, the second insulating layer and the metal layer to form grooves surrounding the intraconnection pieces, a groove surrounding the one of the interconnection tracks and a groove surrounding the other interconnection track,
   depositing a fourth insulant on the face with the first pole piece including in the grooves,
   etching said fourth insulant until said first pole piece, said interconnection tracks and said intraconnection pieces appear, an insulating guard ring remaining around the intraconnection pieces and two interconnection tracks, and
   forming on the thus formed device constituting a subassembly a winding and a second pole piece in contact with the first and having a gap.

5. Process according to claim 4, wherein the operations of forming the winding and the second pole piece comprise the following:
   depositing an insulating layer on the subassembly,
   etching in said insulant two slots in the form of symmetrical spirals on either side of the first pole piece,
   depositing a metal on the complete etched insulant which gives rise to two complementary conductive spirals on either side of the pole piece, said spirals being located on the pole piece, said spirals being located on two different planes, said spirals respectively contacting interconnection tracks ensuring the interconnection thereof,
   depositing on the thus formed device a fifth insulating layer which is etched to free two wells, each of which frees an edge of the first pole piece,
   depositing a magnetic layer coming into contact with the first pole piece and which comprises two parts separated by an amagnetic gap.

6. Process according to claim 1, wherein the conductive magnetic material is an iron-nickel alloy.

* * * * *